Patented Jan. 18, 1944

2,339,622

UNITED STATES PATENT OFFICE 2,339,622

CONDENSATION PRODUCT AND METHOD OF PREPARING THE SAME

Gaetano F. D'Alelio, Pittsfield, Mass., assignor to General Electric Company, a corporation of New York No Drawing. Application December 3, 1941,
Serial No. 421,492

11 Claims. (Cl. 260—42)

This invention relates to new condensation products and to methods of making the same. Generally, it is concerned with resinous compositions prepared from novel imino, amino, imido, and amido compounds. Specifically, it is concerned with, and has as it principal object the preparation of, resinous compositions obtained as condensation products of ingredients comprising an aldehyde and certain novel substituted or unsubstituted bis- (4,6-diamino triazinyl-2 amino-methyl) ureas of the formula

and structure

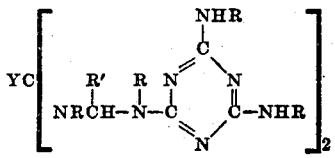

wherein Y represents oxygen or sulphur, R' represents hydrogen or any monovalent aliphatic or aromatic hydrocarbon radical of not more than 6 carbon atoms and R represents hydrogen or any monovalent hydrocarbon radical, whether saturated or unsaturated, substituted or unsubstituted, aliphatic, carbocyclic, aryl, or heterocyclic, mono- or polynuclear, etc. Examples of suitable hydrocarbon radicals represented by R and R" are aliphatic (e. g. methyl, ethyl, propyl, isopropyl, butyl, secondary butyl, butenyl, amyl, hexyl, allyl, etc.); including cycloaliphatic (e. g. cyclopentyl, cyclopentenyl, cyclohexyl, cyclohexenyl, cycloheptyl, etc.); aryl (e. g. phenyl, diphenyl, naphthyl, etc.); aliphatic substituted aryl (e. g. tolyl, xylyl, ethylphenyl, propylphenyl isopropylphenyl, allylphenyl, etc.); aryl substituted aliphatic (e. g. benzyl, phenylallyl, phenylpropyl, etc.); and their homologues, as well as those groups with one or more of their hydrogen atoms substituted by a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc. Preferably all of the (R)s and (R')s in the above formula are hydrogen.

The novel symmetrical bis-triazine derivatives of symmetrical di- (N-methyl) urea or thiourea represented by the above formula may suitably be prepared by reacting, in the cold, a concentrated aqueous solution of 1 mol of a substituted or unsubstituted di-(N-carbinol) urea of the formula

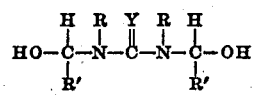

wherein, as previously indicated, Y represents oxygen or sulphur and R and R' represent hydrogen or the designated monovalent aliphatic carbocyclic or aromatic hydrocarbon radicals, wtih a concentrated solution of 2 mols of 2,4,6-triamino, 1,3,5-triazine (melamine) or a derivative thereof in which each amidogen group contains at least one unsubstituted hydrogen, i. e., a triazine having the structural formula

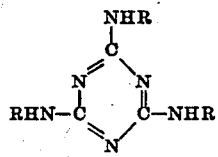

wherein R represents hydrogen or a monovalent hydrocarbon or halogeno-hydrocarbon radical but is preferably hydrogen.

Examples of di-(N-carbinol) ureas other than dimethylol urea are: dimethylol thiourea, methylol methylcarbinol urea and thiourea, di-methylcarbinol urea and thiourea, di-propylcarbinol urea and thiourea, dimethylol phenyl urea and thiourea, dimethylol allyl urea and thiourea, etc.

Examples of substituted 2,4,6-triamino 1,3,5-triazines are the mono-, di- or tri-alkyl or aryl melamines, for instance, 2,4,6-tri-(ethylamino) 1,3,5-triazine, 2,4,6-tri-(phenylamino) 1,3,5-triazine, 2-ethylamino 4,6-diamino 1,3,5-triazine, 2-amino 4,6-di-(phenylamino) 1,3,5-triazine, etc.

Preferably these novel derivatives are prepared by mixing the cold concentrated aqueous solutions of the di-(N-carbinol) urea and the desired amino triazine in the ratio of 1 mol of di-(N-carbinol) urea to 2 mols of the aminotriazine and holding the mixture at temperatures between 0° and —20° C. At these temperatures the two materials undergo a condensation reaction to form the bis-(aminotriazinyl) derivative. Thus the two simplest compounds, melamine and dimethylol urea, react to form bis-(4,6-diamino-triazinyl-2 aminomethyl) urea having the structural formula

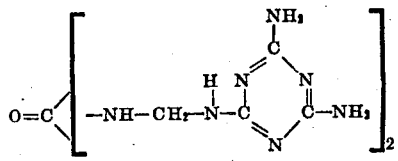

The product of this reaction may be recovered by evaporation of the water at or below room temperature under atmospheric or subatmospheric pressures. Alternatively, the product may be recovered by adding to the aqueous solution of the reaction product a suitable water-miscible precipitant for the reaction product, which precipitant is incapable of reacting with the desired product at operating temperatures.

The resulting compounds may be resinified by reaction with aldehydes or aldehyde engendering substances, preferably under the influence of heat, the unsubstituted bis-melamine derivative of dimethyl urea being most easily resinified under such conditions. The relative ease of resinification decreases with increased substitution of the various substitutable hydrogens by hydrocarbon radicals. Resinification may be accomplished by heating the reactants alone, in inert mediums, or in inert solvents such as water. Resinification may be accelerated by the addition or presence of basic materials, acidic materials, neutral, acid or alkaline salts. Reactive media may likewise be used to achieve resinification as hereinafter shown.

This novel class of organic compounds may be mixed with resin intermediates containing carbinol (—CR$_2$OH) groups, such as monomethylol ureas, dimethylol ureas, phenol methylols, the methylols of cyclic amidines, e. g. methylol melamines, methylol guanazoles, etc.; then co- or inter-resinified alone or in the presence of other modifying bodies to give inter-condensed resins.

Before, during, or after the resinification process, the reaction between the aldehyde or mixture of aldehydes and the novel compounds of this invention may be modified by the presence of suitable amounts of a large class of compounds, for example, hydroxy compounds, e. g., methyl, ethyl, propyl, isopropyl, butyl, amyl, tertiary amyl, benzyl, furfuryl, tetrahydrofurfuryl, cyclohexyl, phenethyl, naphthyl, polyvinyl, allyl, methallyl, crotyl, 1-chlorallyl, propargyl, 2-chlorallyl, cinnamyl alcohols, etc., glycol, diethylene glycol, triethylene glycol, polyethylene oxide, glycerine, pentaerthritol, saligenin, phenol, cresol, xylenol, resorcinol, catechol, pyrogallol, etc., chlorohydrin, epi-chlorohydrin, nitrobutanol, diacetone alcohol, ethylene oxide, propylene oxide, etc.; ammonia and its amino, amido, or imino compounds, e. g., methylamine, dimethylamine, hydroxylamine, hydrazine, phenyl hydrazine, di-amylamine, stearyl amine, cyclohexyl amine, aniline, di-phenylamine, diaminobenzene, triaminobenzene, aminophenol, nitro aniline, piperazine, ethanolamine, di-isopropanolamine, triethanolamine, propanolamine, ethylene diamine, formamide, acetamide, propionamide, lauramide, acrylic amide, methacrylic amide, atropic amide, malonic diamide, itaconic diamide, succinic diamide, citraconic triamide, benzamide, phthalic diamide, phthalimide, benzosulfimide, aminobenzene sulfonamide, benzene disulfonamide, benzene trisulfonamide, anthranilic esters, anthranilamide, salicylamide, para-phenyl benzene sulfonamide, toluamide, etc.; the amino 1,3,5 triazines, e. g., 2,4,6-triamino 1,3,5-triazine, 2-amino 1,3,5-triazine, 2,4-diamino 1,3,5-triazine; the hexadiazines, e. g., 2,4,6-triaminopyrimidine, the diamino pyrimidine thio ethers; the amino 1,2,4-triazoles, e. g., guanazoles, phenyl guanazole, dihydrazino-1,2,4 pyrrodiazole, guanazo-guanazole, imidurazo-guanazole; the amino 1,2-diazoles, e. g., 3,5 diaminopyrazole, the urea type compounds, e. g., urea, methylurea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, di-cyandiamide, guanyl urea, guanyl thiourea, the proteins, e. g., casein, soya bean protein, alfalfa protein, gelatin, coffee bean protein; alkyd resins having free hydroxyl groups such as glyceryl phthalate, oil-modified glyceryl phthalate, diethylene glycol succinate, triethylene glycol maleate, glyceryl maleate, etc.; nitriles, e. g., acetonitrile, propionitrile, butyronitrile, benzonitrile, acrylonitrile, methacrylonitrile, atropic nitrile, ethylene cyanohydrin, acetone cyanohydrin, aminoisobutyronitrile, aminoacetonitrile, etc.; esters, such as lactic esters, hydroxy isobutyric esters, acetoacetic esters, malonic esters, etc.

The highly substituted compounds of this invention may be used as plasticizers for many resins, especially aminoplast resins. In many cases they themselves become resinous during the plasticizing process, while in other cases they condense with the resinous intermediate during manufacturing operations. Specifically, these materials may be used (1) unconverted as plasticizers, (2) partly or completely converted as plasticizers, (3) partly or completely intercondensed to exert a plasticizing effect.

The final and intermediate resins and condensation products prepared from the starting materials of this invention alone or with the modification already expressed are extremely compatible with many other natural or synthetic resins in their intermediate or ultimate stages.

This novel class of compounds, when reacted with aldehydes, alone or with modifications, will form self-curing aminoplasts by condensation with curing reactants, such as chloracetonitrile, nitrourea, glycerine, aminopropanol hydrochloride, mono-, di- or tri-chloroacetamides, alpha,beta - dibrompropionitrile, alpha,beta - dichloro - propionitrile, alpha-methyl, alpha,beta-dichloropropionitrile, aminoacetamide hydrochloride, ethylene diamine monohydrochloride, sulfamic acid, chloracetyl urea, citric diamide, phenacyl chloride and others mentioned, for example in my copending applications Serial No. 346,962, filed July 23, 1940, and Serial No. 354,395, filed August 27, 1940, both of which applications are assigned to the same assignee as the present invention.

The initial reaction leading to the formation of the new condensation products of ingredients comprising an aldehyde and the bis-triazine compounds may be carried out at normal or at elevated temperatures, at atmospheric or superatmospheric pressures, and in the presence or absence of an acid or of an alkaline condensing agent which may be either a direct catalyst or a reactant catalyst. A catalytic reactant or reactant catalyst is defined as a substance which accelerates the reaction between the aldehyde and the aldehyde reactable component or components while it itself becomes an integral part of the condensation product. Preferably the reaction between the components is started under alkaline conditions.

Examples of substances capable of yielding alkaline aqueous solutions and which may be used to obtain alkaline conditions for the initial condensation reaction are alkalis such as sodium, potassium and calcium hydroxides, sodium and potassium carbonates, mono-, di- and tri-amines, etc. Best results are obtained by causing the condensation reaction between the primary components to take place in the presence of a primary condensation catalyst and a secondary condensation catalyst. To obtain condensation products having optimum time- or storage-stability characteristics, I have found that the primary catalyst should be a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc. and (2) nitrogen-containing basic compounds that are aldehyde-reactable, for instance ammonia, primary amines, (e. g., ethyl amine, propyl amine, etc.) and secondary amines (e. g. dipropyl amine, dibutyl amine, etc. Catalytic reactants that may be used include substances such as tri-carbamidomethyl amine, N(CH₂NHCONH₂)₃ or other substituted or unsubstituted mono-, di- or tri-carbamidomethyl amines or substituted or unsubstituted mono-, di- or tri-(mono-carbinol-ureidomethyl) amines such as are disclosed in my copending applications Serial Nos. 409,017 to 409,022, inclusively, filed August 30, 1941, and assigned to the same assignee as the present invention.

The secondary condensation catalyst, which ordinarily is used in an amount less than the amount of primary catalyst, should be a fixed alkali, for instance a carbonate, cyanide or hydroxide of an alkali metal (e. g. sodium, potassium, lithium, etc.).

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively I may first condense either my compound, or some other aldehyde-reactable material such as a urea, a phenol, melamine or the like, with a suitable aldehyde and thereafter, at any stage of the original reaction, add the remaining aldehyde-reactable ingredient or ingredients. Or I may condense or partially condense my novel compounds with an aldehyde, add the resulting product to a urea-aldehyde, a phenol-aldehyde, or some other partial condensation product of an aldehyde and an aldehyde-reactable body and then cause the reaction to proceed further. Still other ways may be employed in combining the components in producing the modified or unmodified products of this invention which will readily be understood by those skilled in the art from the following examples in which the aqueous formaldehyde used contained approximately 37.5 per cent CH₂O and in which the symbol OC(Z)₂ will be equal to

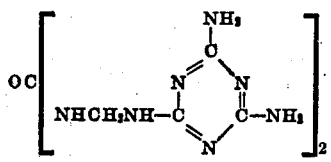

Example 1

| | Mol ratio approximately | Parts by weight |
|---|---|---|
| OC(Z)₂ (containing 17% water) | 1 | 120.5 |
| Aqueous CH₂O | 6 | 142.5 | were refluxed for 13 minutes. The syrupy product was clear while hot and also on cooling. It had a pH of 7.9 and contained 56 per cent resin solids. When heated at 140° C. it was slowly converted to an infusible resin. The addition of chloroacetamide or alpha,beta-dichloropropionitrile greatly accelerated the conversion. A molding compound was prepared by mixing 190 parts of the syrup with 87 parts alpha flock and oven drying the mixture at 70° C. The dried mixture was molded at 135° C. and under 6000 pounds per square inch pressure for 5 minutes. It had an excellent hard cure with very good flow and the product was light-colored.

Example 2

| | Mol ratio (approximately) | Parts |
|---|---|---|
| OC(Z)₂ (containing 17% water) | 1 | 120.5 |
| Aqueous CH₂O | 6 | 142.5 |
| NaOH (in 5.5 parts water) | 0.01 | 0.12 |

The above ingredients were refluxed together for 15 minutes to produce a syrup which was clear while hot and also on cooling and which had a pH of 8.6. The addition of small amounts of chloracetamide to a sample of this syrup resulted in a product having an excellent, hard cure with a long tacky stage. A mixture of 200 parts syrup and 1.1 parts chloroacetamide was refluxed for 10 minutes and mixed with 87 parts alpha flock to produce a wet molding compound. After the compound had been oven-dried at 70° C. it was molded at 135° C. and 6000 pounds per square inch for 5 minutes. It had excellent hard cure with good flow. The molded product was light colored.

Example 3

| | Mol ratio (approximately) | Parts |
|---|---|---|
| OC(Z)₂ (containing 17% water) | 1 | 120.5 |
| Aqueous CH₂O | 6 | 142.5 |
| Aqueous ammonia (approx. 28% NH₃) | ⅛ | 2.5 |
| NaOH (in 5.5 parts water) | 0.01 | 0.12 |

The syrup resulting from refluxing the above ingredients for 20 minutes was clear while hot and also on cooling and had a pH of 8.25. A sample thereof tested at 140° C. had a very slow cure which was greatly accelerated by the addition of chloroacetamide. A mixture of 200 parts syrup, 1.1 parts chloroacetamide, and 87 parts alpha flock were mixed and the mixture oven-dried at 70° C. When molded at 135° C. under 6000 pounds per square inch pressure for 5 minutes the compound exhibited excellent, hard cure. The molded product had a smooth, shiny surface and was light colored.

Example 4

|  | Mol ratio (approximately) | Parts |
| --- | --- | --- |
| OC(Z)$_2$ (containing 17% water) | 1 | 77 |
| Acrolein | 6 | 65 |
| NaOH (in 3.5 parts water) | 0.01 | 0.08 |

The melamine complex was mixed with acrolein. The NaOH in dilute aqueous solution was added and a violent reaction occurred with the result that the batch turned solid. The product, however, could be melted down at 140° C. and was self-curing at that temperature.

Example 5

|  | Mol ratio (approximately) | Parts |
| --- | --- | --- |
| OC(Z)$_2$ (containing 17% water) | 1 | 120.5 |
| Aqueous N(CH$_2$NHCONCH$_2$OH)$_3$ (25% conc.) | 0.1 | 9.7 |
| Aqueous CH$_2$O | 6 | 142.5 |

The above materials were refluxed for 25 minutes. The resulting syrup was clear while hot and also on cooling and had a pH of 7.9. It was self-curing at 135° C. The addition of chloroacetamide greatly accelerated the cure and produced a harder product. A molding compound prepared by 270 parts syrup with 90 parts alpha flock and oven drying the mixture at 70° C. was molded at 135° C. under 6000 pounds per square inch pressure for 5 minutes. The compound had an excellent, hard cure, and showed good flow during molding. The molded product was very light-colored.

Example 6

|  | Mol ratio (approximately) | Parts |
| --- | --- | --- |
| OC(Z)$_2$ (containing 17% water) | 1 | 120.5 |
| Urea | 1 | 17.8 |
| Aqueous CH$_2$O | 8 | 190.0 |

The above ingredients were refluxed for 15 minutes. The syrup was clear and had a pH of 7.25. It cured alone at 140° C. although the cure was accelerated by the addition of chloroacetamide or other curing agents. The addition of 100 parts alpha flock to 270 syrup produced a molding compound which, after being dried at 70° C. had an excellent hard cure and good flow when molded at 135° C. for 5 minutes under a pressure of 6000 pounds per square inch. The product had a glossy surface and was light-colored.

Example 7

An equivalent amount of thiourea (22.6 parts) was substituted for the urea in the above formula. The clear resin syrup obtained after refluxing the mixture for 15 minutes had a pH of 7.35. The type of cure, molding characteristics, and appearance of the molded product obtained with this syrup were substantially the same as with that of Example 6.

Example 8

|  | Mol ratio (approximately) | Parts |
| --- | --- | --- |
| OC(Z)$_2$ (containing 17% water) | 1 | 120.5 |
| Para toluene sulfonamide | 1 | 50.8 |
| Aqueous CH$_2$O | 8 | 190.0 |
| NaOH (in 5.5 parts water) | 0.01 | 0.12 | were refluxed for 15 minutes. The syrup was clear while hot and cloudy on cooling. It had a pH of 8.75. Samples thereof tested at 135° C. did not cure alone. The addition of chloroacetamide or alpha,beta-dichloropropionitrile resulted in an excellent, lengthy, hard cure and molding compounds prepared and molded in accordance with the procedure set forth in the previous examples using 340 parts syrup, 15 parts alpha flock and 1.9 parts chloroacetamide had a soft cure and extensive flow. The molded product possessed a dull surface of a slightly yellow color.

Example 9

|  | Mol ratio (approximately) | Parts |
| --- | --- | --- |
| OC(Z)$_2$ (containing 17% water) | 1 | 120.5 |
| Aqueous CH$_2$O | 8 | 190.0 |
| Phenol | 1 | 28.5 |
| NaOH (in 5.5 parts water) | 0.01 | 0.12 |

The above materials were refluxed for 15 minutes to give a syrup which was clear while hot and also on cooling. It had a pH of 7.85. At 135° C. the syrup cured after a prolonged period. Chloroacetamide accelerated the cure and a molding compound prepared in accordance with the preceding examples from 300 parts syrup, 120 parts alpha flock, and 1.9 parts chloroacetamide had an excellent hard cure with excessive flow. The molded product had a yellow cast.

Example 10

|  | Mol ratio (approximately) | Parts |
| --- | --- | --- |
| OC(Z)$_2$ (containing 17% water) | 1 | 120.5 |
| Melamine | 1 | 37.5 |
| Aqueous CH$_2$O | 9 | 214.0 |

The above reactants were mixed and refluxed for 15 minutes. The syrup was clear while hot and also on cooling and had a pH of 7.55. It cured alone at 135° C. and a molding compound containing 32 parts resin syrup and 13 parts alpha flock had an excellent cure, good flow and was light-colored.

Example 11

|  | Mol ratio (approximately) | Parts |
| --- | --- | --- |
| OC(Z)$_2$ (containing 17% water) | 1 | 120.5 |
| Dimethylol urea (containing 11% water) | 16 | 642.0 |
| NH$_3$ (in 2.5 parts water) | ¼ | 0.6 |
| H$_2$O (distilled) |  | 1,000 |

The above components were refluxed for 15 minutes. The syrup had a pH of 6.6 and would not cure alone at 135° C. Chloroacetamide gave it an excellent hard cure. A molding compound prepared from 450 parts syrup (32.5% resin solid content), 1.4 parts chloroacetamide, and 120 parts alpha flock exhibited good molding characteristics. The molded product was fairly hard and had a slightly dull surface.

*Example 12*

|  | Mol ratio (approximately) | Parts |
|---|---|---|
| OC(Z)₂ (containing 17% water) | 1 | 120.5 |
| Aqueous CH₂O | 9 | 214.0 |
| NH₃ (in 2.5 parts water) | ½ | 0.6 |
| Aqueous trimethylol melamine (50% solution) | 1 | 127.0 |

When the above mixture was refluxed for 15 minutes, a clear resin syrup with a pH of 7.25 was obtained. It had a good cure alone and with chloroacetamide or other curing agents. A molding compound containing 42 parts resin syrup and 12 parts alpha flock had an excellent hard cure and the molded product had a very shiny, light-colored surface.

*Example 13*

|  | Mol ratio (approximately) | Parts |
|---|---|---|
| OC(Z)₂ (containing 17% water) | 1 | 120.5 |
| Aqueous CH₂O | 6 | 142.5 |
| Glycerine |  | 10.0 | were refluxed for 15 minutes. The resin syrup was clear while hot and very viscous on cooling. It had a pH of 7.65. The cure alone at 135° C. was very slow but the addition of chloroacetamide or alpha,beta-dichloropropionitrile to the syrup gave an excellent, fast curing resin.

*Example 14*

|  | Mol ratio (approximately) | Parts |
|---|---|---|
| OC(Z)₂ (containing 17% water) | 1 | 120.5 |
| Aqueous CH₂O | 6 | 142.5 |
| Butyl alcohol |  | 20.0 |

The above mixture was refluxed for 15 minutes. The resin syrup was clear and had a pH of 7.65. It had a very slow cure at 135° C. Chloroacetamide both accelerated the cure and produced a harder product.

*Example 15*

|  | Mol ratio (approximately) | Parts |
|---|---|---|
| OC(Z)₂ (containing 17% water) | 1 | 120.5 |
| Aqueous CH₂O | 6 | 142.5 |
| Diethyl malonate |  | 20 |
| NaOH (in 5.5 parts water) | 0.01 | 0.12 | were refluxed for 15 minutes. The resulting syrup was clear while hot and a white paste on cooling. The paste when tested on the hot plate at 135° C. was self-curing, curing quickly to a hard product.

*Example 16*

|  | Mol ratio (approximately) | Parts |
|---|---|---|
| OC(Z)₂ (containing 17% water) | 1 | 120.5 |
| Aqueous CH₂O | 6 | 142.5 |
| NH₃ (in 2.5 parts water) | ½ | 0.6 |
| Acetamide |  | 20.0 |

The above components were refluxed for 15 minutes. The syrup was clear while hot and also on cooling. It had a pH of 7.65 and had a very good cure alone at 135° C. With chloroacetamide the cure was excellent.

Although in the above examples I have shown that satisfactory molding compounds can be made without the use of curing agents, or curing reactants, the use of such curing accelerators is recommended where molded pieces having maximum gloss and water resistance and minimum molding time are desired.

In producing any of these new condensation products, the choice of the aldehyde component is dependent largely upon economic considerations and the particular properties desired in the finished product. I prefer to use as the aldehyde reactant, formaldehyde or compounds engendering formaldehyde, e. g. paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Various aldehyde-addition products may be used instead of aldehydes. Such products include the mono- and poly-(N-carbinol) derivatives, more particularly the mono- and polymethylol derivatives, of urea, thiourea, selenourea, and iminourea, substituted ureas, thioureas, selenoureas, and iminoureas, amides of poly-carboxylic acids, e. g. maleic, itaconic, fumeric, adipic, malonic, citric, phthalic, etc. I may also use with particularly good results, the methylol amino triazines, e. g., mono-, di-, tri-, tetra-, penta-, and hexa-methylol melamines; the methylol amino diazines, e. g., trimethylol, 1,3,5-triamino pyrrimidine; the amino triazoles, e. g., dimethylol guanazole, etc. Mixtures of these materials or mixtures of an aldehyde with such materials may also be used.

The ratio of aldehydic reactant to the bis-triazinyl derivatives of this invention may be varied over a wide range but ordinarily is of the order corresponding to at least one mol of the aldehyde, or an equivalent amount of an aldehyde engendering- or addition products, for each mol of the bistriazinyl derivative. Thus, I may use for example from one to five or six mols, preferably 3 mols, of an aldehyde for each mol of the derivative.

In producing these various condensation products, dyes, pigments, plasticizer, mold lubricants, opacifiers, and various fillers, (e. g. wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels, for bonding or cementing together mica flames to form a laminated mica article, for bonding together abrasive grains in the production of resin-bonded abrasive articles such for instance as grindstones, sandpapers, etc. They also may be employed for treating cotton, linen, and other cellulosic materials in sheet or other form or as impregnants for electrical coils and for other electrically insulating applications.

What I claim as new and desire to secure by Letters Patent of the United States, is:

1. A composition of matter comprising the reaction product of ingredients comprising an aldehyde and a bis-triazine derivative corresponding to the formula

CY[NR—CHR'—NR—C₃N₃(NHR)₂]₂ where Y is a member of the class consisting of oxygen and sulphur, R' is a member of the class consisting of hydrogen and monovalent hydrocarbon radicals of not more than six carbon atoms, and R is a member of the class consisting of hydrogen, monovalent hydrocarbon radicals, and monovalent halogeno-substituted hydrocarbon radicals.

2. A composition as in claim 1 wherein the aldehyde is formaldehyde.

3. A composition comprising a condensation product of ingredients comprising an aldehyde and a bis-triazine derivative corresponding to the general formula

CY[NR—CHR'—NR—C₃N₃—(NHR)₂]₂ where Y represents oxygen and R and R' represent hydrogen.

4. A composition comprising a condensation product of ingredients comprising formaldehyde and a bis-triazine derivative corresponding to the general formula

CY[NR—CHR'—NR—C₃N₃—(NHR)₂]₂ where Y represents oxygen and R and R' represent hydrogen.

5. A composition as in claim 1 wherein the reaction product is an alcohol-modified product of the stated components.

6. A composition comprising the product of reaction of ingredients comprising a non-triazenylamino-methylated urea, an aldehyde and a bis-triazine derivative of the general formula

CY[NR—CHR'—NR—C₃N₃—(NHR)₂]₂ where Y is a member of the class consisting of oxygen and sulphur, R' is a member of the class consisting of hydrogen and monovalent hydrocarbon radicals of not more than six carbon atoms, and R is a member of the class consisting of hydrogen, monovalent hydrocarbon radicals, and monovalent halogeno-substituted hydrocarbon radicals.

7. A composition comprising the product of reaction of melamine, formaldehyde, and a bis-triazine derivative of the formula

CY[NR—CHR'—NR—C₃N₃—(NHR)₂]₂ where Y is a member of the class consisting of oxygen and sulphur, R' is a member of the class consisting of hydrogen and monovalent hydrocarbon radicals of not more than six carbon atoms, and R is a member of the class consisting of hydrogen, monovalent hydrocarbon radicals, and monovalent halogeno-substituted hydrocarbon radicals.

8. A heat-curable composition comprising the heat-convertible product of reaction of (1) a partial condensation product of ingredients comprising urea, an aldehyde and a bis-triazine derivative of the general formula

CY[NR—CHR'—NR—C₃N₃—(NHR)₂]₂ where Y is a member of the class consisting of oxygen and sulphur, R' is a member of the class consisting of hydrogen and a monovalent hydrocarbon radical of not more than six carbon atoms, and R is a member of the class consisting of hydrogen and monovalent hydrocarbon and halogeno-hydrocarbon radicals, and (2) an alpha,beta-dichloropropionitrile.

9. A product comprising the heat-cured composition of claim 8.

10. A resinous composition comprising the product of reaction of ingredients comprising an aldehyde, a tri-(monocarbinolureidomethyl) amine of the formula N(CH₂NHCONHCH₂OH)₃ and a bis-triazine derivative corresponding to the formula

CY[NR—CHR'—NR—C₃N₃—(NHR)₂]₂ where Y is a member of the class consisting of oxygen and sulphur, R' is a member of the class consisting of hydrogen and a monovalent hydrocarbon radical of not more than six carbon atoms, and R is a member of the class consisting of hydrogen and monovalent hydrocarbon and halogeno-hydrocarbon radicals.

11. The method of preparing new condensation products which comprises effecting reaction between ingredients comprising an aldehyde and a bis-triazine derivative corresponding to the formula

CY[NR—CHR'—NR—C₃N₃—(NHR)₂]₂ where Y is a member of the class consisting of oxygen and sulphur, R' is a member of the class consisting of hydrogen and monovalent hydrocarbon radicals of not more than six carbon atoms, and R is a member of the class consisting of hydrogen and monovalent hydrocarbon and halogeno-hydrocarbon radicals.

GAETANO F. D'ALELIO.

CERTIFICATE OF CORRECTION.

Patent No. 2,339,622.  January 18, 1944.

GAETANO F. D'ALELIO.

It is hereby certified that error appears in the printed specification of the above numbered patent requiring correction as follows: Page 2, second column, line 11, for "guanazoles" read --guanazole--; line 55, for "glycerine" read --glycine--; page 5, second column, line 49, for "bistriazinyl" read --bis-triazinyl--; page 6, first column, line 45-46, for "non-triazenylamino" read --non-triazinylamino--; and that the said Letters Patent should be read with this correction therein that the same may conform to the record of the case in the Patent Office.

Signed and sealed this 11th day of April, A. D. 1944.

Leslie Frazer

(Seal)  Acting Commissioner of Patents.